United States Patent
Watanabe et al.

(10) Patent No.: US 11,453,445 B2
(45) Date of Patent: Sep. 27, 2022

(54) STRUCTURE OF VEHICLE CABIN

(71) Applicant: TOYOTA JIDOSHA KABUSHIKI KAISHA, Aichi-ken (JP)

(72) Inventors: Jumpei Watanabe, Nagakute (JP); Yasuhiro Hara, Nagoya (JP); Norimasa Koreishi, Miyoshi (JP); Hirotaka Ishioka, Toyota (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 56 days.

(21) Appl. No.: 17/114,351

(22) Filed: Dec. 7, 2020

(65) Prior Publication Data

US 2021/0245815 A1    Aug. 12, 2021

(30) Foreign Application Priority Data

Feb. 10, 2020   (JP) .............................. JP2020-020945

(51) Int. Cl.
| | |
|---|---|
| *B62D 25/20* | (2006.01) |
| *B60K 1/04* | (2019.01) |
| *B62D 25/04* | (2006.01) |
| *B60N 2/005* | (2006.01) |

(52) U.S. Cl.
CPC ............ *B62D 25/2027* (2013.01); *B60K 1/04* (2013.01); *B62D 25/04* (2013.01); *B60N 2/005* (2013.01); *B60Y 2306/01* (2013.01)

(58) Field of Classification Search
CPC ......... B60K 1/00; B60K 1/04; B60Y 2306/01
USPC .......................... 296/37.8, 204, 193.07, 37.15
See application file for complete search history.

(56) References Cited

U.S. PATENT DOCUMENTS

| | | |
|---|---|---|
| 2006/0006696 A1 | 1/2006 | Umemoto et al. |
| 2007/0210617 A1 | 9/2007 | Nakamura |
| 2010/0264681 A1* | 10/2010 | Rori ...................... B60R 21/026 |
| | | 296/24.43 |
| 2014/0124280 A1 | 5/2014 | Kimura et al. |
| 2016/0090062 A1 | 3/2016 | Karube et al. |
| 2021/0245815 A1 | 8/2021 | Watanabe et al. |

FOREIGN PATENT DOCUMENTS

| | | |
|---|---|---|
| EP | 2180100 A1 | 4/2010 |
| JP | H11348690 A | 12/1999 |
| JP | 201120628 A | 2/2011 |
| JP | 2013112137 A | 6/2013 |
| JP | 2013244768 A | 12/2013 |
| JP | 2015217819 A | 12/2015 |
| JP | 201668840 A | 5/2016 |

(Continued)

*Primary Examiner* — Dennis H Pedder
(74) *Attorney, Agent, or Firm* — Hauptman Ham, LLP

(57) ABSTRACT

A structure of a vehicle cabin includes a vehicle seat arranged inside the vehicle cabin and above electronic equipment, a first panel unit composing a part of a floor panel, arranged to overlap the electronic equipment when viewed from a vehicle-height direction, and supporting the electronic equipment from a vehicle lower side directly or via a member, and a second panel unit composing a part of the floor panel and arranged in front of the electronic equipment in the vehicle front-rear direction to overlap the electronic equipment when viewed from the vehicle front-rear direction. The floor panel separates the inside of the vehicle cabin from the outside thereof and composes a lower part of the vehicle cabin.

13 Claims, 9 Drawing Sheets

(56) References Cited

FOREIGN PATENT DOCUMENTS

| | | | |
|---|---|---|---|
| JP | 201688157 | A | 5/2016 |
| JP | 6795109 | B1 | 12/2020 |
| WO | 2008013564 | A1 | 1/2008 |

* cited by examiner

STRUCTURE OF VEHICLE CABIN

CROSS-REFERENCE TO RELATED APPLICATION

This application claims priority to Japanese Patent Application No. 2020-020945 filed on Feb. 10, 2020, incorporated herein by reference in its entirety.

BACKGROUND

1. Technical Field

The present disclosure relates to a structure of a vehicle cabin.

2. Description of Related Art

Japanese Unexamined Patent Application Publication No. 2011-20628 (JP 2011-20628 A) discloses a structure of a motor room. In the motor room structure, electronic equipment, such as an inverter, is arranged in the motor room provided outside a vehicle cabin, such that it is possible to prevent a boarding space of an occupant inside the vehicle cabin from being restricted.

SUMMARY

However, as described above, in the related art, since the electronic equipment is arranged outside the vehicle cabin, it is considered that a collision load applied to the vehicle is likely to be applied to the electronic equipment.

The present disclosure provides a structure of a vehicle cabin that can prevent electronic equipment from being affected by a collision load applied to a vehicle while preventing the electronic equipment from restricting a boarding space of an occupant inside the vehicle cabin.

A structure of a vehicle cabin according to an aspect of the present disclosure includes a vehicle seat arranged inside the vehicle cabin and above electronic equipment, a first panel unit composing a part of a floor panel, arranged to overlap the electronic equipment when viewed from a vehicle-height direction, and supporting the electronic equipment from a vehicle lower side directly or via a member, and a second panel unit composing a part of the floor panel and arranged in front of the electronic equipment in the vehicle front-rear direction to overlap the electronic equipment when viewed from the vehicle front-rear direction. The floor panel separates the inside of the vehicle cabin from the outside of the vehicle cabin and composes a lower part of the vehicle cabin.

With the above configuration, the vehicle seat is arranged inside the vehicle cabin and above the electronic equipment. Therefore, the boarding space of the occupant inside the vehicle cabin is secured above the electronic equipment.

However, when the electronic equipment is arranged outside the vehicle cabin, it is considered that a collision load applied to the vehicle is likely to be applied to the electronic equipment.

Here, in the above configuration, the floor panel composing the lower part of the vehicle cabin separates the inside of the vehicle cabin from the outside thereof. The electronic equipment is supported, directly or via a member, from the vehicle lower side by the first panel unit composing a part of the floor panel.

Further, the floor panel includes the second panel unit positioned in front of the electronic equipment in the vehicle front-rear direction. The first panel unit is arranged to overlap the electronic equipment when viewed from the vehicle-height direction, and the second panel unit is arranged to overlap the electronic equipment when viewed from the vehicle front-rear direction.

Therefore, in the above configuration, a collision load applied to the vehicle is applied to the first panel unit or the second panel unit before being applied to the electronic equipment.

In the above aspect, the structure may further include a floor cross unit provided to project from at least one side of the first panel unit and the second panel unit to the outer side of the vehicle cabin when viewed from the vehicle width direction, extending in the vehicle width direction, and having a closed cross-section when viewed from the vehicle width direction.

With the above configuration, the floor cross unit is provided to project from at least one side of the first panel unit and the second panel unit of the floor panel to the outer side of the vehicle cabin when viewed from the vehicle width direction. Therefore, it is possible to prevent the boarding space of the occupant inside the vehicle cabin from being reduced by the floor cross unit.

Further, the floor cross unit extends in the vehicle width direction and has a closed cross-section when viewed from the vehicle width direction. Therefore, it is possible to increase a cross-sectional secondary moment of a cross-section of a part of the floor panel where the floor cross unit is provided when viewed from the vehicle width direction, as compared with a cross-sectional secondary moment of a cross-section of a part of the floor panel where the floor cross unit is not provided when viewed from the vehicle width direction.

Moreover, the above configuration has an effect of making the floor panel less likely to be deformed by a load in the vehicle width direction in a periphery of the electronic equipment while securing the boarding space of the occupant inside the vehicle cabin.

In the above aspect, the floor cross unit may be provided along a periphery on an upper side of the second panel unit, and the vehicle seat may be connected to the floor cross unit directly or via a member.

With the above configuration, the floor cross unit is provided along the periphery on the upper side of the second panel unit. The vehicle seat is connected to the floor cross unit directly or via a member, and a load applied from the vehicle seat side can be supported by the floor cross unit.

Moreover, the above configuration has an effect of supporting the vehicle seat in a stable state with respect to the floor panel.

In the above aspect, a separation unit that separates the vehicle cabin in the vehicle front-rear direction may be arranged behind the vehicle seat in the vehicle front-rear direction. The separation unit may be stretched in the vehicle-height direction between a roof panel composing an upper part of the vehicle cabin and the floor panel, and the vehicle seat may be connected to the separation unit directly or via a member.

With the above configuration, the separation unit arranged behind the vehicle seat in the vehicle front-rear direction separates the vehicle cabin in the vehicle front-rear direction.

In supporting the vehicle seat, a supporting member may be arranged on the first panel unit and support the vehicle seat. However, with such a configuration, it is considered that a bending moment generated to the supporting member by a load applied from the vehicle seat side increases, and thus supporting the vehicle seat in a stable state becomes difficult.

Here, in the above configuration, the vehicle seat is connected to the separation unit directly or via a member, and the separation unit is stretched in the vehicle-height direction between the roof panel composing the upper part of the vehicle cabin and the floor panel. Therefore, a load applied from the vehicle seat side is delivered to the roof panel and the floor panel via the separation unit, and dispersed.

The above configuration has an effect of supporting the vehicle seat in a stable state while securing space for accommodating the electronic equipment between the vehicle seat and the floor panel.

In the above aspect, the structure may further include a first pillar unit arranged on one side of the separation unit in the vehicle width direction and extending in the vehicle-height direction, a second pillar unit arranged on the other side of the separation unit in the vehicle width direction and extending in the vehicle-height direction, an upper cross unit configured to reinforce the roof panel which is connected to the first pillar unit and the second pillar unit directly or via a member and extends in the vehicle width direction, and a lower cross unit configured to reinforce the floor panel which is connected to the first pillar unit and the second pillar unit directly or via a member and extends in the vehicle width direction. A constraint device that is configured to constrain the occupant sitting in the vehicle seat may be attached to the separation unit.

With the above configuration, the first pillar unit extending in the vehicle-height direction is arranged on one side of the separation unit in the vehicle width direction, and the second pillar unit extending in the vehicle-height direction is arranged on the other side of the separation unit in the vehicle width direction.

Further, the roof panel is reinforced by the upper cross unit extending in the vehicle width direction, and the upper cross unit is connected to the first pillar unit and the second pillar unit directly or via a member. On the other hand, the floor panel is reinforced by the lower cross unit extending in the vehicle width direction, and the lower cross unit is connected to the first pillar unit and the second pillar unit directly or via a member. As such, an annular structure unit having an annular shape when viewed from the vehicle front-rear direction is formed inside the vehicle cabin.

In addition, the constraint device that can constrain the occupant sitting in the vehicle seat is attached to the separation unit, such that an inertial force generated to the occupant when the vehicle brakes or a collision load is applied to the vehicle is delivered to the separation unit via the constraint device.

Here, in the above configuration, the separation unit and the above-described annular structure unit are continuous, and thus the inertial force generated to the occupant is delivered to the annular structure unit via the constraint device and the separation unit, and supported.

The above configuration has an effect that the constraint device can constrain the occupant sitting in the vehicle seat in a stable state.

In the above aspect, the electronic equipment may be arranged to overlap the first panel unit at the center of the first panel unit in the vehicle width direction when viewed from the vehicle-height direction.

With the above configuration, the electronic equipment is arranged to overlap the first panel unit at the center of the first panel unit in the vehicle width direction when viewed from the vehicle-height direction. Accordingly, when a collision load in the vehicle width direction is applied to the vehicle, it is possible to secure a distance between a point to which the collision load is applied and the electronic equipment.

Moreover, the above configuration has an effect that it is possible to prevent a collision load in the vehicle width direction applied to the vehicle from being applied to the electronic equipment.

As described above, a structure of a cabin of a vehicle according to the aspect of the present disclosure has an effect of preventing electronic equipment from being affected by a collision load applied to the vehicle while preventing a boarding space of an occupant inside the vehicle cabin from being restricted by the electronic equipment.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinbelow, an example of an embodiment of a structure of a vehicle cabin according to the present disclosure will be described with reference to FIGS. 1 to 9. In addition, arrows are appropriately illustrated in each drawing. More specifically, an arrow FR represents the vehicle front side, an arrow UP represents the vehicle upper side, and an arrow LH represents the left side in the vehicle width direction.

Figure 9:
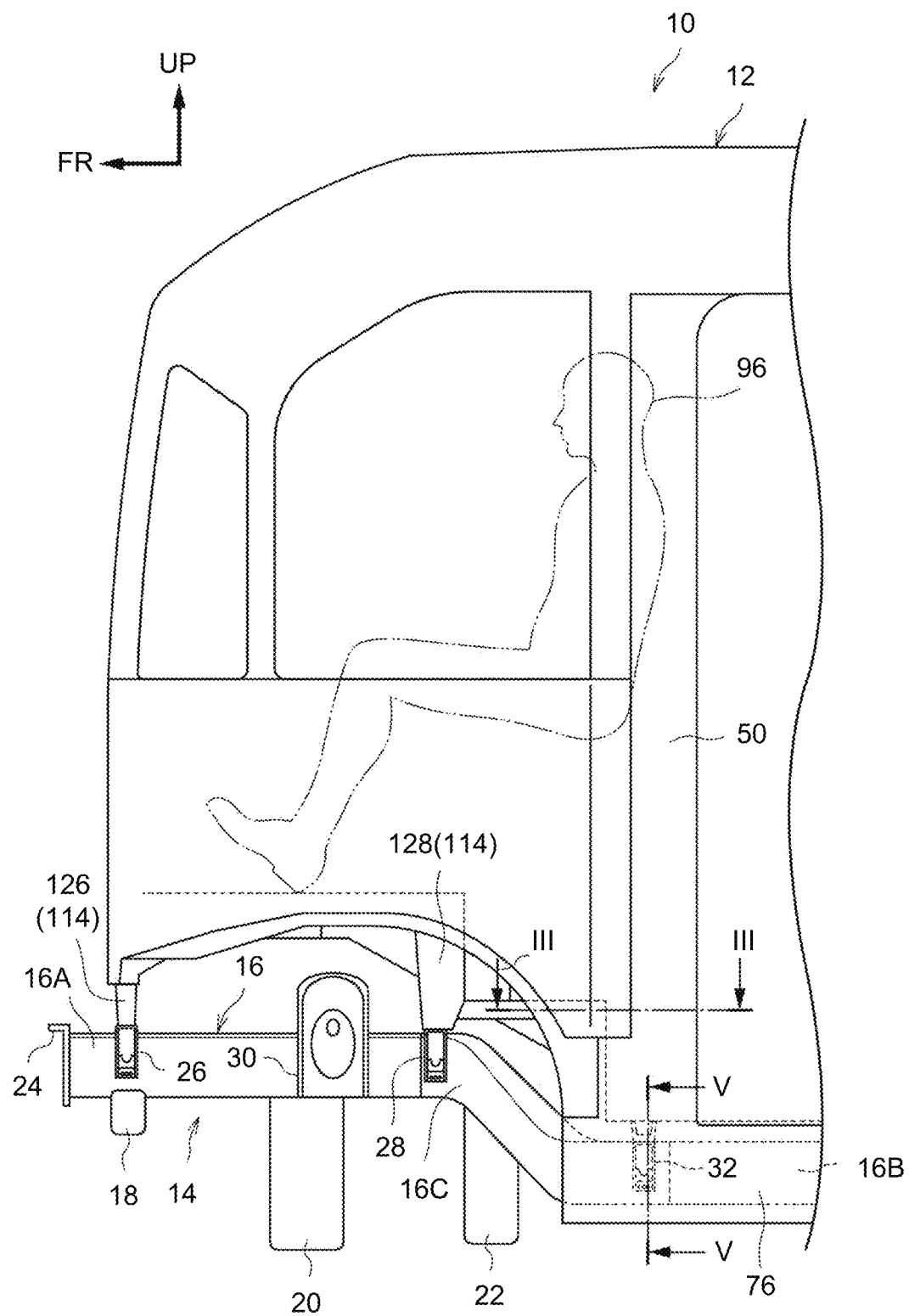
FIG. 9 is a side view schematically illustrating the configuration of the vehicle body to which the vehicle cabin structure according to the present embodiment is applied.

As illustrated in FIG. 9, a "vehicle 10", to which the vehicle cabin structure according to the present embodiment is applied, includes a vehicle body 12 made of steel and a frame 14 that is made of steel and supports the vehicle body 12, and has a so-called frame structure.

Figure 8:
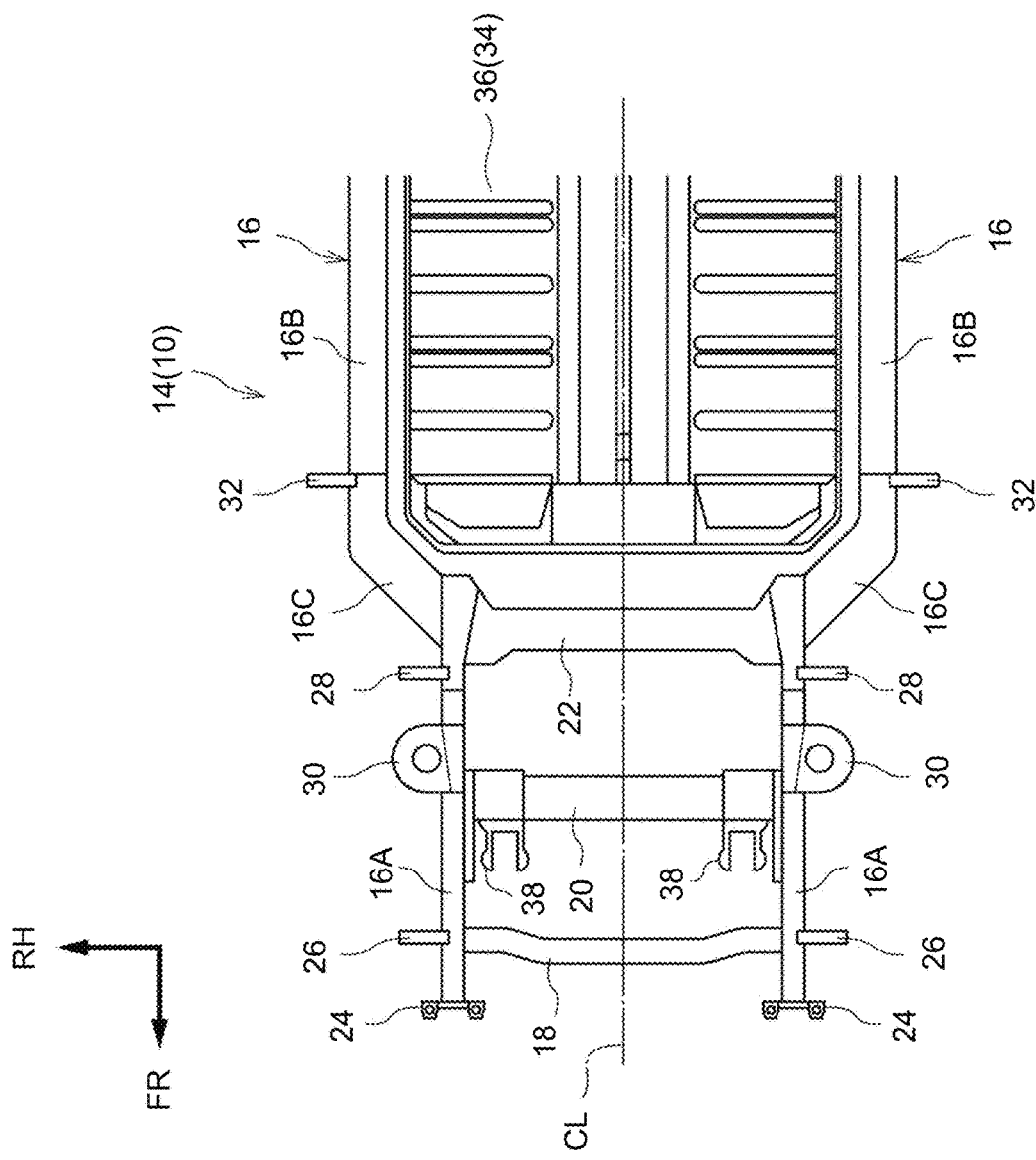
FIG. 8 is a plan view schematically illustrating a configuration of a frame of the vehicle to which the vehicle cabin structure according to the present embodiment is applied.

As illustrated in FIG. 8, the frame 14 includes a pair of side frame units 16 arranged with a space therebetween in the vehicle width direction, and a first cross unit 18, a second cross unit 20, and a third cross unit 22 which are bridged between the side frame units 16.

Each side frame unit 16 extends entirely in the vehicle front-rear direction, includes a front frame unit 16A, a main frame unit 16B, and a kick unit 16C, and has a closed cross-section structure having a closed cross-section when viewed from the vehicle front-rear direction.

More specifically, the front frame unit 16A composes a front part of the side frame unit 16 in the front-rear direction and linearly extends in the vehicle front-rear direction. A mounting plate unit 24 is provided at a front end part of the front frame unit 16A in the vehicle front-rear direction, and a front bumper reinforcement (not shown) is attached to the mounting plate unit 24.

Moreover, a first mounting unit 26 supporting the vehicle body 12 is provided in a front part of the front frame unit 16A in the vehicle front-rear direction, and a second mounting unit 28 also supporting the vehicle body 12 is provided in a rear part of the front frame unit 16A in the vehicle front-rear direction. Further, a suspension tower 30 is provided in a part between the first mounting unit 26 and the second mounting unit 28 of the front frame unit 16A, and a shock absorber or the like (not shown) is attached to the suspension tower 30.

The main frame unit 16B composes a central part of the side frame unit 16 in the vehicle front-rear direction, is arranged on the outside of the front frame unit 16A in the vehicle width direction and on the vehicle lower side, and linearly extends in the vehicle front-rear direction. A third mounting unit 32 supporting the vehicle body 12 is provided in a front part of the main frame unit 16B in the vehicle front-rear direction.

In addition, a battery pack 34 that can supply power to a power unit (not shown) is arranged between the main frame units 16B. The battery pack 34 includes a battery case 36 that is made of aluminum alloy and forms an outer shell thereof, and a plurality of battery modules (not shown) arranged inside the battery case 36. The battery pack 34 is arranged in such a way that a main part thereof is positioned between an upper surface and a lower surface of the main frame unit 16B when viewed from the vehicle width direction.

The kick unit 16C is interposed between the front frame unit 16A and the main frame unit 16B. The kick unit 16C extends from the front frame unit 16A toward the vehicle rear side and outward in the vehicle width direction when viewed from the vehicle-height direction, and extends from the front frame unit 16A toward the vehicle rear side and the vehicle lower side when viewed from the vehicle width direction.

The first cross unit 18 extends in the vehicle width direction, and connects the front frame units 16A to each other in the vehicle width direction on the vehicle lower side of the respective first mounting units 26.

The second cross unit 20 extends in the vehicle width direction, and connects the front frame units 16A to each other in the vehicle width direction on the vehicle lower side of the respective suspension towers 30. Further, a pair of motor mounting units 38 is provided on the second cross unit 20, and a motor composing a part of the power unit is mounted on the motor mounting units 38.

The third cross unit 22 extends in the vehicle width direction, and connects the front frame units 16A to each other in the vehicle width direction at a boundary with the kick units 16C on the front frame units 16A.

Figure 7:
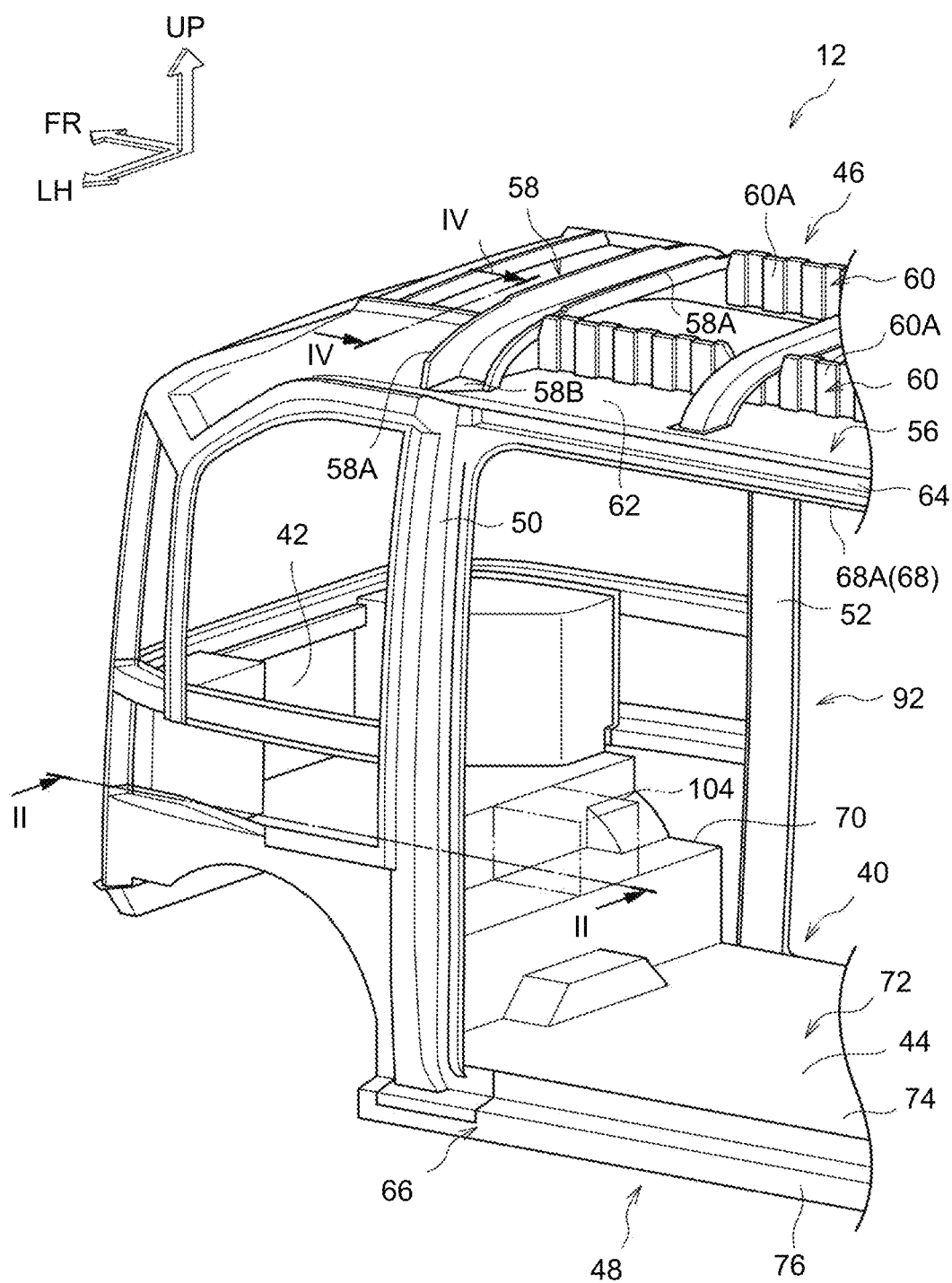
FIG. 7 is a perspective view schematically illustrating a configuration of the vehicle body to which the vehicle cabin structure according to the present embodiment is applied.

Next, a configuration of the vehicle body 12 will be described. As illustrated in FIG. 7, the vehicle body 12 is box-shaped, and has an outer shape which is a substantially rectangular parallelepiped extending in the vehicle front-rear direction. The vehicle body 12 basically has a symmetrical structure with respect to a center line CL (see FIG. 8) extending in the vehicle front-rear direction, and composes a main part of a "vehicle cabin 40". The vehicle cabin 40 is separated in the vehicle front-rear direction by a "partition unit 94" as a separation unit to be described below. A part of the vehicle cabin 40 on the vehicle front side of the partition unit 94 is a driver cabin 42, and a part of the vehicle cabin 40 on the vehicle rear side of the partition unit 94 is a passenger cabin 44.

The vehicle body 12 includes a roof unit 46 composing an upper part of the vehicle cabin 40 in the vehicle-height direction, a floor unit 48 composing a lower part of the vehicle cabin 40 in the vehicle-height direction, and a "first pillar unit 50" and a "second pillar unit 52" that respectively connect the roof unit 46 with the floor unit 48 in the vehicle-height direction.

Figure 4:
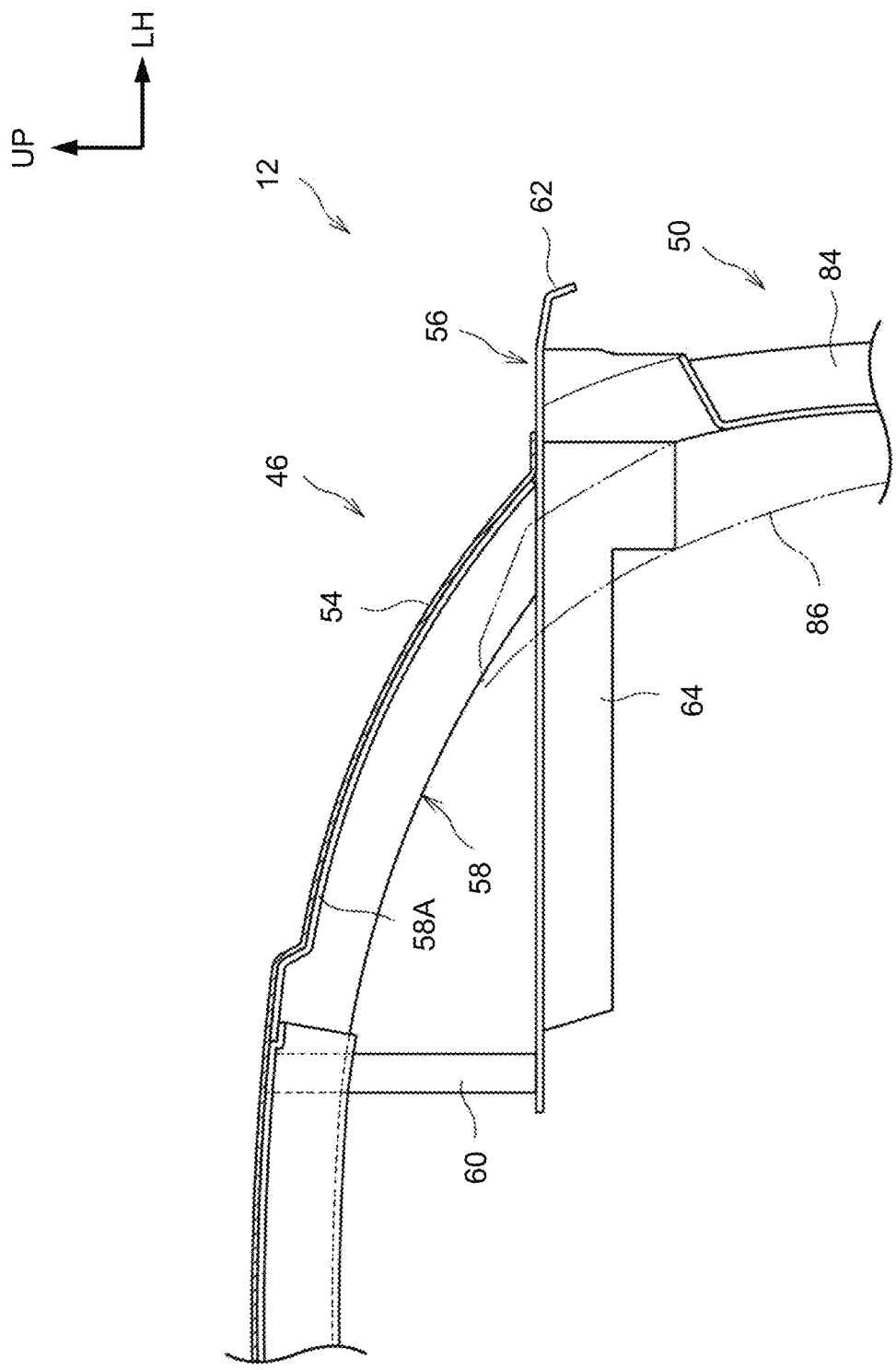
FIG. 4 is a cross-sectional view schematically illustrating a configuration of an upper part of the vehicle body to which the vehicle cabin structure according to the present embodiment is applied (a cross-sectional view illustrating a state where the vehicle body is cut along a line IV-IV in FIG. 7) when viewed from the vehicle front-rear direction.

As illustrated in FIG. 4, the roof unit 46 includes a "roof panel 54" composing an upper surface thereof, a pair of roof side rails 56 composing an outer part thereof in the vehicle width direction, an "upper cross unit 58" reinforcing the roof panel 54, and a reinforcing panel 60. However, the roof panel 54 is not shown in FIG. 7 so as to facilitate understanding of a configuration of the roof side rails 56 and the like.

The roof panel 54 is in the shape of a rectangular plate having the plate thickness direction set as the vehicle-height direction and having the length in the vehicle front-rear direction when viewed from the vehicle-height direction. Moreover, the roof panel 54 is convex and curved toward the vehicle upper side when viewed from the vehicle front-rear direction.

The roof side rail 56 is arranged on the vehicle lower side of the roof panel 54, and includes a roof side rail upper 62 composing an upper part of the roof side rail 56 in the vehicle-height direction and a roof side rail lower 64 composing a lower part of the roof side rail 56 in the vehicle-height direction. The roof side rail 56 has an outer shape which is set, such that a length in the vehicle width direction is longer than a length in the vehicle-height direction and is a substantially rectangular parallelepiped extending in the vehicle front-rear direction.

The roof side rail upper 62 is joined to an end part on the outer side of the roof panel 54 in the vehicle width direction at a joint (not shown) by welding or the like.

As illustrated in FIG. 7, the roof side rail 56 is arranged along an upper edge 68A of a door opening 68 provided on a lateral portion 66 of the vehicle body 12. Slide doors (not shown) that open and close the door opening 68 can be arranged on the vehicle lower side of the roof side rail 56.

The upper cross unit 58 is arranged along the roof panel 54 on the vehicle lower side of the roof panel 54, and extends in the vehicle width direction. The upper cross unit 58 has a cross-section which is in the shape of a hat open to the vehicle upper side when viewed from the vehicle width direction. A flange 58A of the upper cross unit 58 is joined to the roof panel 54 at a joint (not shown) by welding or the like. The upper cross unit 58, together with the roof panel 54, forms a closed cross-section structure when viewed from the vehicle width direction.

A mounting piece 58B is provided at an end part on the outer side of the upper cross unit 58 in the vehicle width direction, and joined to the roof side rail upper 62 at a joint (not shown) by welding or the like.

As illustrated in FIG. 4, the reinforcing panel 60 extends from an end part on the inner side of the roof side rail upper 62 in the vehicle width direction to the vehicle upper side. A plurality of convex portions 60A extending in the vehicle width direction is provided on a surface on the outer side and a surface on the inner side of the reinforcing panel 60 in the vehicle width direction, respectively, with predetermined spaces therebetween in the vehicle front-rear direction. An end part on the vehicle upper side of the reinforcing panel 60 is joined to the roof panel 54, and an end part on the vehicle lower side of the reinforcing panel 60 is joined to the roof side rail upper 62, respectively, at joints (not shown) by welding or the like.

On the other hand, the floor unit 48 includes a front floor unit 70 composing a part on the driver cabin 42 side and a center floor unit 72 composing a part on the passenger cabin 44 side. A configuration of the front floor unit 70 will be described below, and here, a configuration of the center floor unit 72 will be described.

Figure 1:
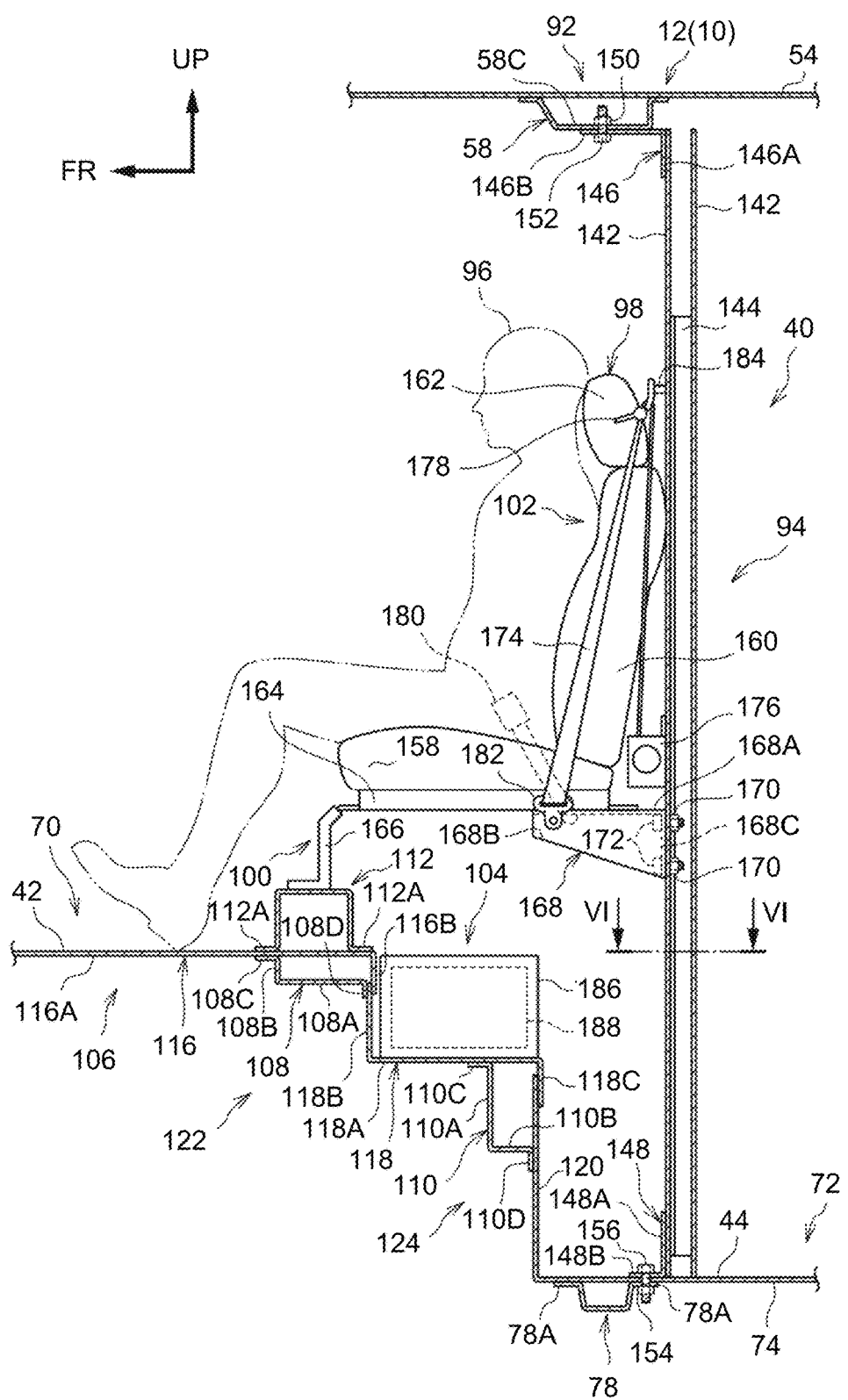
FIG. 1 is a cross-sectional view schematically illustrating a configuration of a cabin of a vehicle to which a structure of the vehicle cabin according to the present embodiment is applied when viewed from the vehicle width direction.

As illustrated in FIG. 1, the center floor unit 72 includes a "center floor panel 74" as a floor panel, a pair of rockers 76, and a "lower cross unit 78". The center floor panel 74 is in the shape of a plate extending in the vehicle front-rear direction and the vehicle width direction, and composes a floor surface on the passenger cabin 44 side.

Figure 5:
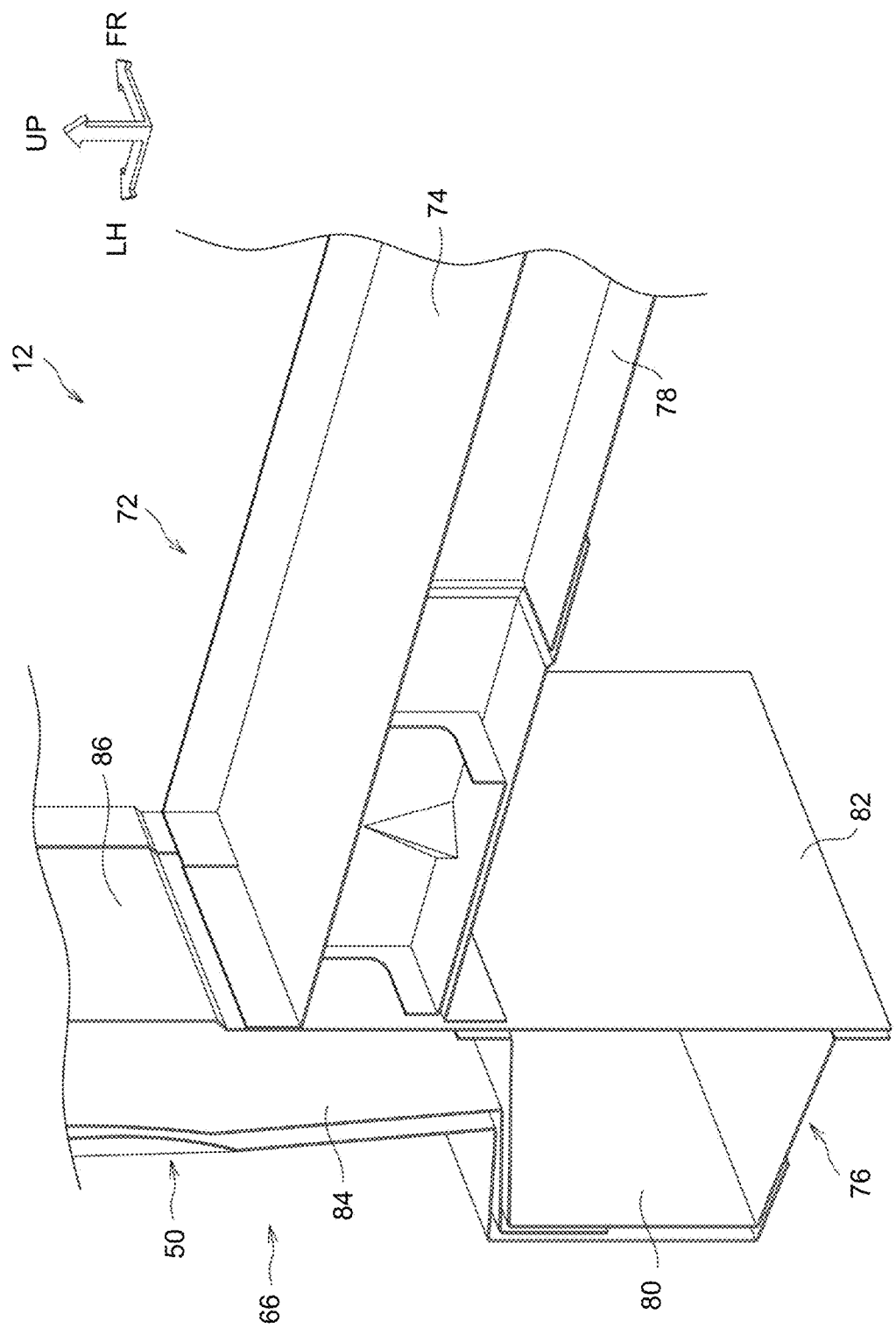
FIG. 5 is a perspective cross-sectional view schematically illustrating a configuration of the periphery of the pillar unit in the vehicle body to which the vehicle cabin structure according to the present embodiment is applied (a cross-sectional view illustrating a state where the vehicle body is cut along a line V-V in FIG. 9)

The rocker 76 extends in the vehicle front-rear direction along a periphery on the outer side of the center floor panel 74 in the vehicle width direction. As illustrated in FIG. 5, the rocker 76 includes a rocker outer 80 composing an outer part thereof in the vehicle width direction and a rocker inner 82 composing an inner part thereof in the vehicle width direction, and has a closed cross-section structure when viewed from the vehicle front-rear direction. A surface on the inner side of the rocker inner 82 in the vehicle width direction is joined to an end part on the outer side of the center floor panel 74 in the vehicle width direction at a joint (not shown) by welding or the like.

As illustrated in FIGS. 1 and 5, the lower cross unit 78 is arranged to overlap the upper cross unit 58 when viewed from the vehicle-height direction while arranged along a periphery on the vehicle front side of the center floor panel 74 on the vehicle lower side of the center floor panel 74. The lower cross unit 78 has a cross-section which is in the shape of a hat open to the vehicle upper side when viewed from the vehicle width direction, and extends in the vehicle width direction.

The lower cross unit 78 has a closed cross-section structure in which a cross-section when viewed from the vehicle width direction is a closed cross-section together with the center floor panel 74, because a pair of flanges 78A provided on both sides thereof in the vehicle front-rear direction is joined to the center floor panel 74 at joints (not shown) by welding or the like.

Figure 3:
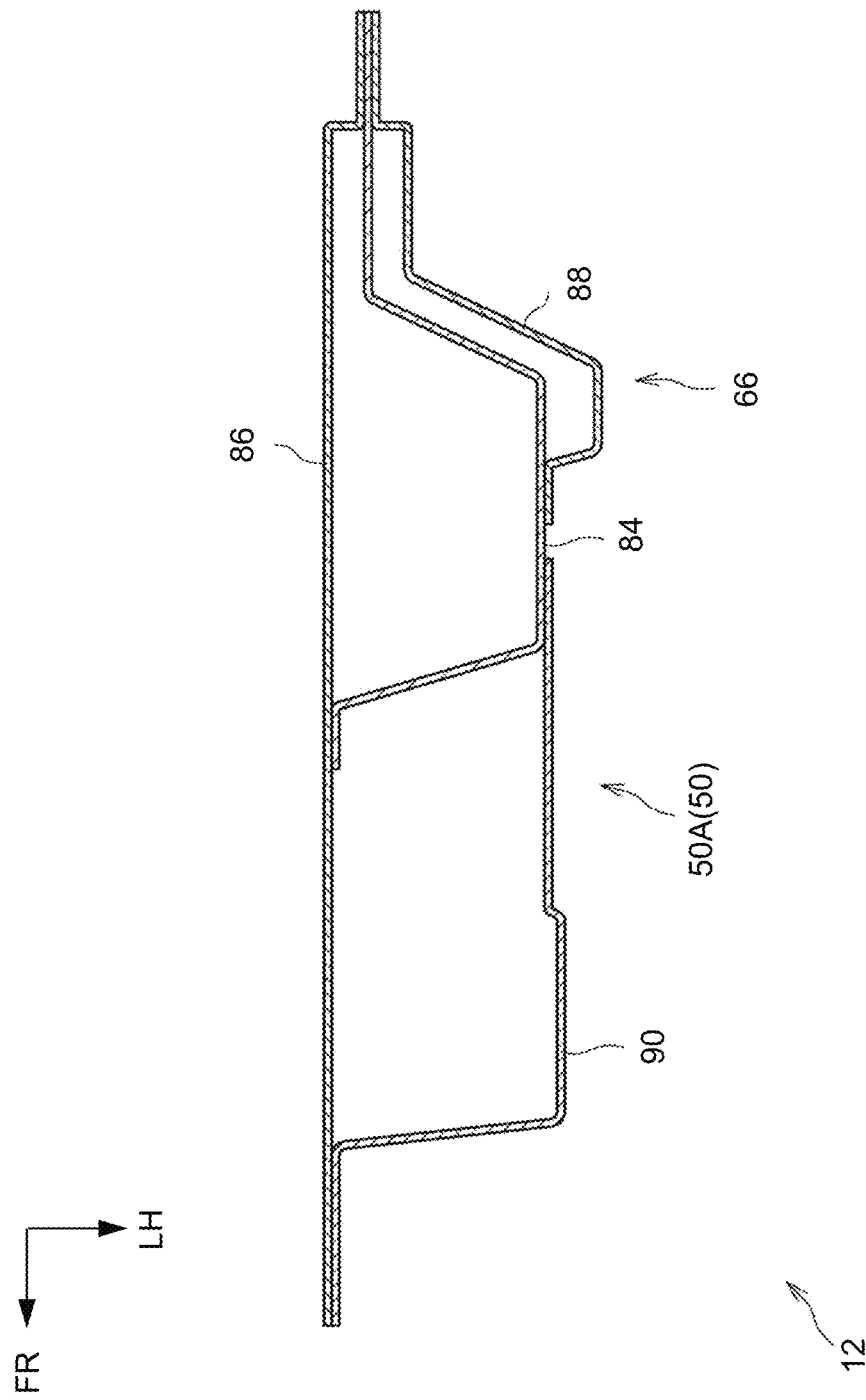
FIG. 3 is a cross-sectional view schematically illustrating a configuration of a periphery of a pillar unit in the vehicle body to which the vehicle cabin structure according to the present embodiment is applied (a cross-sectional view illustrating a state where the vehicle body is cut along a line in FIG. 9) when viewed from the vehicle-height direction.

As illustrated in FIG. 7, the first pillar unit 50 composes a part of the lateral portion 66 on one side in the vehicle width direction (the left side in the vehicle width direction), is positioned at a boundary between the driver cabin 42 and the passenger cabin 44 when viewed from the vehicle width direction, and extends in the vehicle-height direction. As illustrated in FIGS. 3 and 5, the first pillar unit 50 includes a pillar outer 84 composing an outer part thereof in the vehicle width direction and a pillar inner 86 composing an inner part thereof in the vehicle width direction, and has a closed cross-section structure when viewed from the vehicle-height direction.

As illustrated in FIG. 4, an end part on the vehicle upper side of the pillar outer 84 is joined to the roof side rail lower 64, and an end part on the vehicle lower side of the pillar outer 84 is joined to the rocker outer 80, respectively, at joints (not shown) by welding or the like.

Further, an end part on the vehicle upper side of the pillar inner 86 is joined to the upper cross unit 58 at a joint (not shown) by welding or the like, and a part on the vehicle lower side of the pillar inner 86 is integrated with the rocker inner 82. Moreover, a part on the vehicle lower side of the pillar inner 86 is joined to an end part on the outer side of the lower cross unit 78 in the vehicle width direction at a joint (not shown) by welding or the like. In FIG. 4, the pillar inner 86 is represented by a dash double dotted line so as to facilitate understanding of the configuration of the roof side rail 56 and the like.

Returning to FIG. 3, a part on the vehicle rear side of a lower portion 50A of the first pillar unit 50 is covered with a first side outer panel 88 from the outer side in the vehicle width direction. The first side outer panel 88 composes an outer part in the vehicle width direction in a part of the lateral portion 66 on the passenger cabin 44 side. The first side outer panel 88 is joined to the pillar outer 84 at a joint (not shown) by welding or the like.

On the other hand, a part on the vehicle front side of the lower portion 50A is covered with a second side outer panel 90 from the outer side in the vehicle width direction. The second side outer panel 90 composes an outer part in the vehicle width direction in a part of the lateral portion 66 on the driver cabin 42 side. The second side outer panel 90 is joined to the pillar outer 84 at a joint (not shown) by welding or the like. In FIG. 7, the first side outer panel 88 and the second side outer panel 90 are not shown so as to facilitate understanding of a configuration of the first pillar unit 50 and the like.

Meanwhile, the second pillar unit 52 composes a part of the lateral portion 66 on the other side in the vehicle width direction (the right side in the vehicle width direction), and basically has the same configuration as that of the first pillar unit 50. Further, in the same manner as in the first pillar unit 50, the upper cross unit 58 and the lower cross unit 78 are joined to the second pillar unit 52. As such, as illustrated in FIGS. 1 and 7, the boundary between the driver cabin 42 and the passenger cabin 44 includes the first pillar unit 50, the second pillar unit 52, the upper cross unit 58, and the lower cross unit 78 while an annular structure unit 92 having an annular shape when viewed from the vehicle front-rear direction is formed therein.

Here, the vehicle cabin structure according to the present embodiment has characteristics in a configuration of the driver cabin 42 and its periphery. Hereinafter, the configuration of the driver cabin 42 and its periphery which compose a main part of the present embodiment will be described in detail.

As illustrated in FIG. 1, the driver cabin 42 includes a front floor unit 70 composing a lower part thereof in the vehicle-height direction, and the partition unit 94. Inside the driver cabin 42, a "vehicle seat 98 (hereinafter referred to as a seat 98)" on which a driver (occupant) 96 can sit, a seat supporting unit 100, a "constraint device 102" that can constrain the driver 96, and an equipment unit 104 are provided.

Figure 2:
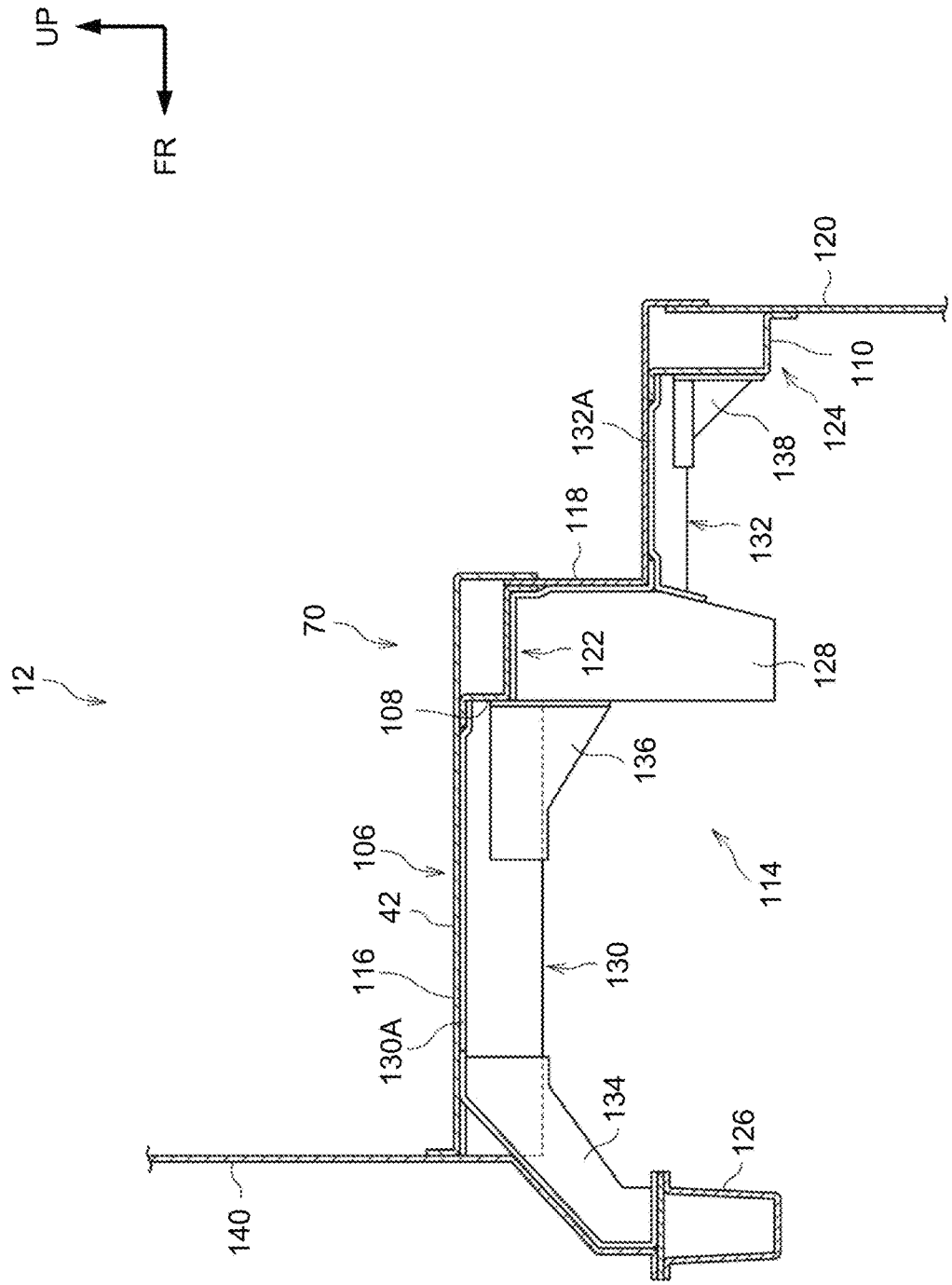
FIG. 2 is a cross-sectional view schematically illustrating a configuration of a lower part of a body of the vehicle to which the vehicle cabin structure according to the present embodiment is applied (a cross-sectional view illustrating a state where the vehicle body is cut along a line II-II in FIG. 7) when viewed from the vehicle width direction.

As illustrated in FIG. 2, the front floor unit 70 includes a "front floor panel 106" as a floor panel that separates the inside of the driver cabin 42 from the outside thereof, a first cross member 108, a second cross member 110, a third cross member 112, and a pair of side reinforcing units 114.

More specifically, the front floor panel 106 includes a front panel 116 composing a front part thereof in the vehicle front-rear direction, a center panel 118 composing a central part thereof in the vehicle front-rear direction, and a rear panel 120 composing a rear part thereof in the vehicle front-rear direction.

The front panel 116 includes a main wall 116A composing a main part thereof and an "extending wall 116B" as a second panel unit. The main wall 116A is in the shape of a rectangular plate extending in the vehicle front-rear direction and the vehicle width direction when viewed from the vehicle-height direction, and the extending wall 116B extends from a periphery on the vehicle rear side of the main wall 116A to the vehicle lower side.

The center panel 118 includes a "main wall 118A" as a first panel unit composing a main part thereof, an "extending wall 118B" as a second panel unit, and an extending wall 118C. The main wall 118A is arranged on the vehicle lower side behind the main wall 116A, and is in the shape of a rectangular plate extending in the vehicle front-rear direction and the vehicle width direction when viewed from the vehicle-height direction.

The extending wall 118B extends from a periphery on the vehicle front side of the main wall 118A to the vehicle upper side. The extending wall 118B is joined to the extending wall 116B at a joint (not shown) by welding or the like while an end part on the vehicle upper side of the extending wall 118B overlaps the extending wall 116B on the vehicle front side thereof. On the other hand, the extending wall 118C extends from a periphery on the vehicle rear side of the main wall 118A to the vehicle lower side.

The rear panel 120 is in the shape of a rectangular plate extending in the vehicle width direction and the vehicle-height direction when viewed from the vehicle front-rear direction. The rear panel 120 is joined to the extending wall 118C at a joint (not shown) by welding or the like while an end part of the vehicle upper side of the rear panel 120 overlaps the extending wall 118C on the vehicle front side thereof. On the other hand, an end part of the vehicle front side of the center floor panel 74 is joined to an end part on the vehicle lower side of the rear panel 120 at a joint (not shown) by welding or the like.

The first cross member 108 is arranged on the vehicle lower side of the main wall 116A and on the vehicle front side of the extending wall 116B of the front panel 116. The first cross member 108 includes a lateral wall 108A, a longitudinal wall 108B, and mounting walls 108C, 108D. The lateral wall 108A has the plate thickness direction set as the vehicle-height direction and faces the main wall 116A. The longitudinal wall 108B extends from a periphery on the vehicle front side of the lateral wall 108A to the vehicle upper side, and faces the extending wall 116B.

The mounting wall 108C extends from a periphery on the vehicle upper side of the longitudinal wall 108B to the vehicle front side. The mounting wall 108C is joined to the main wall 116A at a joint (not shown) by welding or the like while overlapping the main wall 116A on the vehicle lower side thereof. On the other hand, the mounting wall 108D extends from a periphery on the vehicle rear side of the lateral wall 108A to the vehicle lower side. The mounting wall 108D is joined to the extending wall 118B of the center panel 118 at a joint (not shown) by welding or the like while overlapping the extending wall 118B on the vehicle front side thereof.

An end part (not shown) on the outer side of the first cross member 108 in the vehicle width direction is joined to the pillar inner 86 at a joint (not shown) by welding or the like.

As described above, the first cross member 108 is attached to the front panel 116 and the center panel 118, such that a "first floor cross unit 122" extending in the vehicle width direction and having a closed cross-section when viewed from the vehicle width direction is formed as a floor cross unit.

In other words, the first floor cross unit 122 includes the front panel 116, the center panel 118, and the first cross member 108, and is provided to project from the extending walls 116B, 118B side to the outer side of the driver cabin 42 when viewed from the vehicle width direction. The first floor cross unit 122 is arranged along the periphery on the vehicle upper side of the extending wall 116B.

The second cross member 110 is arranged on the vehicle lower side of the main wall 118A and on the vehicle front side of the extending wall 118C of the center panel 118, and includes a longitudinal wall 110A, a lateral wall 110B, and mounting walls 110C, 110D. The longitudinal wall 110A has the plate thickness direction set as the vehicle width direction and faces the rear panel 120. The lateral wall 110B extends from a periphery on the vehicle lower side of the longitudinal wall 110A to the vehicle rear side, and faces the main wall 118A.

The mounting wall 110C extends from a periphery on the vehicle upper side of the longitudinal wall 110A to the vehicle front side. The mounting wall 110C is joined to the main wall 118A at a joint (not shown) by welding or the like while overlapping the main wall 118A on the vehicle lower side thereof. On the other hand, the mounting wall 110D extends from a periphery on the vehicle rear side of the lateral wall 110B to the vehicle lower side. The mounting wall 110D is joined to the rear panel 120 at a joint (not shown) by welding or the like while overlapping the rear panel 120 on the vehicle front side thereof.

An end part (not shown) on the outer side of the second cross member 110 in the vehicle width direction is joined to the pillar inner 86 at a joint (not shown) by welding or the like.

As described above, the second cross member 110 is attached to the center panel 118 and the rear panel 120, such that a "second floor cross unit 124" extending in the vehicle width direction and having a closed cross-section when viewed from the vehicle width direction is formed as a floor cross unit.

In other words, the second floor cross unit 124 includes the center panel 118, the rear panel 120, and the second cross member 110, and is provided to project from the main wall 118A side to the outer side of the driver cabin 42 when viewed from the vehicle width direction. The second floor cross unit 124 is arranged along the periphery on the vehicle rear side of the main wall 118A.

The third cross member 112 has a cross-section which is in the shape of a hat open to the vehicle lower side when viewed from the vehicle width direction, and extends in the vehicle width direction. The third cross member 112 is arranged on the vehicle upper side of the main wall 116A of the front panel 116 while most part of the third cross member 112 overlaps the first floor cross unit 122 when viewed from the vehicle-height direction.

A flange 112A of the third cross member 112 is joined to the main wall 116A at a joint (not shown) by welding or the like, such that the third cross member 112, together with the main wall 116A, forms a closed cross-section structure when viewed from the vehicle width direction. In other words, the third cross member 112 is connected to the first floor cross unit 122.

The side reinforcing units 114 are arranged at a predetermined distance on the inner side in the vehicle width direction from ends on the outer sides of the first floor cross unit 122 and the second floor cross unit 124 in the vehicle width direction so as to reinforce the front floor panel 106. The side reinforcing unit 114 includes a first supporting unit 126, a pair of second supporting units 128, a first side member 130, a second side member 132, a first connecting unit 134, a second connecting unit 136, and a third connecting unit 138.

Specifically, the first supporting unit 126 composes a part on the vehicle lower side at the front end of the vehicle body 12 and is in the shape of a box extending in the vehicle width direction. A lower surface of the first supporting unit 126 is fixed to the first mounting unit 26 by a fixing member (not shown). Further, an end part on the vehicle lower side of a front surface panel 140 composing a part of the front surface of the vehicle body 12 is joined to an upper surface of the first supporting unit 126 at a joint (not shown) by welding or the like.

On the vehicle lower side of the first cross member 108, the second supporting units 128 are arranged with a space therebetween in the vehicle width direction. Each second supporting unit 128 is in the shape of a box extending from the first cross member 108 to the vehicle lower side, and is joined to the first cross member 108 and the center panel 118, respectively, at joints (not shown) by welding or the like. In addition, a lower surface of the second supporting unit 128 is set, such that its position in the vehicle-height direction is approximately the same as that of the lower surface of the first supporting unit 126, and is fixed to the second mounting unit 28 by a fixing member (not shown).

The first side member 130 extends in the vehicle front-rear direction between the front surface panel 140 and the first cross member 108. The first side member 130 has a cross-section which is in the shape of a hat open to the vehicle upper side when viewed from the vehicle front-rear direction. A flange 130A of the first side member 130 is joined to the front panel 116 at a joint (not shown) by welding or the like, such that the first side member 130, together with the front panel 116, forms a closed cross-section structure when viewed from the vehicle front-rear direction. The first side member 130 is also joined to the front surface panel 140, the first cross member 108, and the second supporting unit 128 at joints (not shown) by welding or the like.

The second side member 132 extends in the vehicle front-rear direction between the second supporting unit 128 and the second cross member 110. The second side member 132 has a cross-section which is in the shape of a hat open to the vehicle upper side when viewed from the vehicle front-rear direction. A flange 132A of the second side member 132 is joined to the center panel 118 at a joint (not shown) by welding or the like, such that the second side member 132, together with the center panel 118, forms a closed cross-section structure when viewed from the vehicle front-rear direction. The second side member 132 is also joined to the second supporting unit 128 and the second cross member 110 at joints (not shown) by welding or the like.

The first connecting unit 134 extends from the first supporting unit 126 upwardly to the vehicle rear side when viewed from the vehicle width direction. The first connecting unit 134 has a cross-section which is in the shape of a hat open to the vehicle upper side when viewed from the vehicle front-rear direction. The first connecting unit 134 is joined to the first supporting unit 126, the front surface panel 140, the front panel 116, and the first side member 130 at joints (not shown) by welding or the like so as to connect them.

The second connecting unit 136 extends in the vehicle front-rear direction. The second connecting unit 136 has a U-shaped cross-section which is open to the vehicle upper side when viewed from the vehicle front-rear direction. The second connecting unit 136 is joined to the first side member 130, the first cross member 108, and the second supporting unit 128 at joints (not shown) by welding or the like so as to connect them.

The third connecting unit 138 extends in the vehicle front-rear direction when viewed from the vehicle width direction. The third connecting unit 138 has a U-shaped cross-section which is open to the vehicle upper side when viewed from the vehicle front-rear direction. The third connecting unit 138 is joined to the second side member 132 and the second cross member 110 at joints (not shown) by welding or the like so as to connect them.

Returning to FIG. 1, the partition unit 94 is arranged between the first pillar unit 50 and the second pillar unit 52 when viewed from the vehicle front-rear direction, and includes a pair of partition panels 142, a pair of reinforcing members 144, a plurality of upper side supporting brackets 146, and a plurality of lower side supporting brackets 148.

Figure 6:
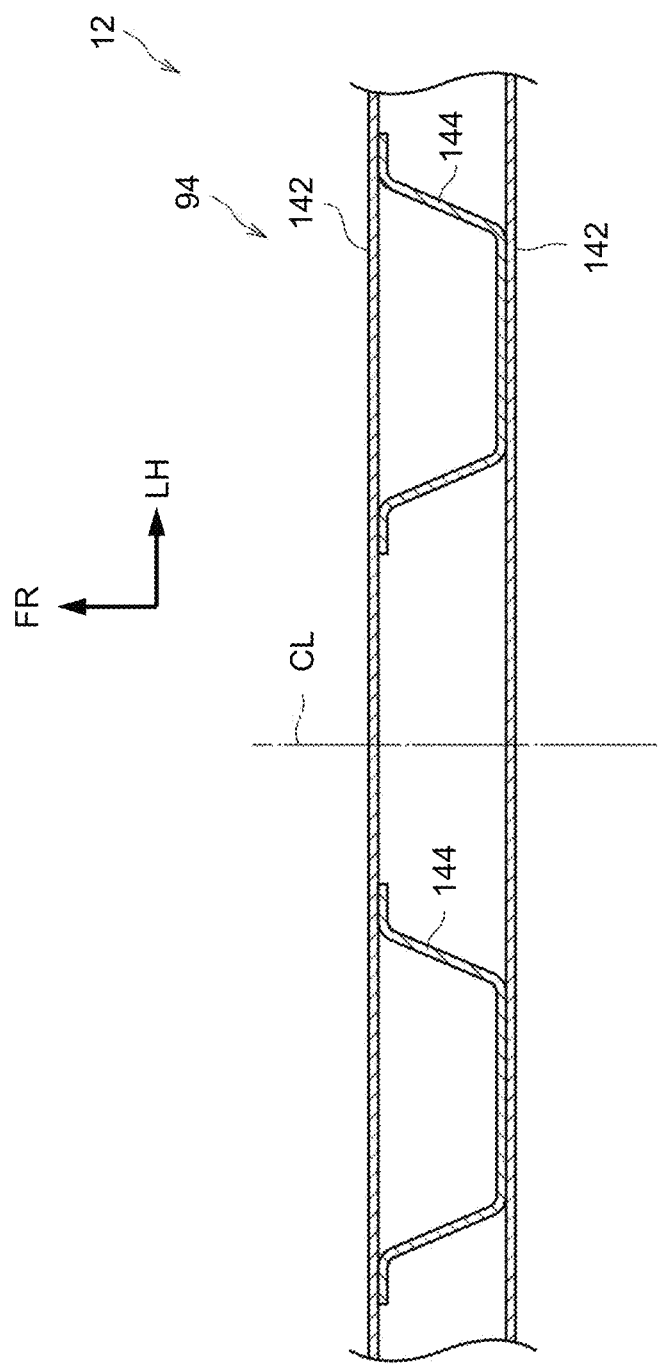
FIG. 6 is a cross-sectional view schematically illustrating a configuration of a partition unit in the vehicle body to which the vehicle cabin structure according to the present embodiment is applied (a cross-sectional view illustrating a state where the vehicle body is cut along a line VI-VI in FIG. 1) when viewed from the vehicle-height direction.

As illustrated in FIG. 6, the partition panels 142 are in the shape of a rectangular plate extending in the vehicle width direction and the vehicle-height direction when viewed from the vehicle front-rear direction, and are arranged with a space therebetween in the vehicle front-rear direction. Moreover, the partition panel 142 on the vehicle front side is positioned on the vehicle rear side of the upper cross unit 58 and the lower cross unit 78.

The reinforcing members 144 extend in the vehicle-height direction. The reinforcing members 144 have cross-sections which are in the shape of a hat open to the vehicle front side when viewed from the vehicle-height direction. The reinforcing members 144 are arranged with a space therebetween so as to be symmetrical with respect to the center line CL when viewed from the vehicle front-rear direction, and are joined to the partition panels 142 at joints (not shown) by welding or the like in a state where the reinforcing members 144 are sandwiched between the partition panels 142.

The upper side supporting brackets 146 are arranged with predetermined spaces therebetween along an end part on the vehicle upper side of the partition panel 142 on the vehicle front side. Each upper side supporting bracket 146 includes a joining piece 146A and a mounting piece 146B, and has an L shape when viewed from the vehicle width direction.

More specifically, the joining piece 146A is arranged along the partition panel 142 and is joined thereto at a joint (not shown) by welding or the like. On the other hand, the mounting piece 146B is arranged along a bottom wall 58C of the upper cross unit 58. The mounting piece 146B is attached to the upper cross unit 58 by a weld nut 150 provided on a surface on the vehicle upper side of the bottom wall 58C, and a bolt 152 fastened to the weld nut 150 from the vehicle lower side thereof.

The lower side supporting brackets 148 are arranged with predetermined spaces therebetween along an end part on the vehicle lower side of the partition panel 142 on the vehicle front side. Each lower side supporting bracket 148 includes a joining piece 148A and a mounting piece 148B, and has an L shape when viewed from the vehicle width direction.

More specifically, the joining piece 148A is arranged along the partition panel 142 and is joined thereto at a joint (not shown) by welding or the like. On the other hand, the mounting piece 148B is arranged along the center floor panel 74. The mounting piece 148B is attached to the center floor panel 74 and the lower cross unit 78 by a weld nut 154 provided on a surface on the vehicle lower side of the flange 78A on the vehicle rear side of the lower cross unit 78, and a bolt 156 fastened to the weld nut 154 from the vehicle upper side thereof.

In other words, although the partition unit 94 is arranged on the vehicle upper side via the upper cross unit 58, the partition unit 94 is stretched between the roof panel 54 and the center floor panel 74 in the vehicle-height direction.

Meanwhile, as illustrated in FIG. 1, the seat 98 includes a seat cushion 158, a seat back 160, a headrest 162, and a pair of seat rails 164 that enables the seat cushion 158 to slide in the vehicle front-rear direction. The seat 98 is arranged on the vehicle upper side of the front floor unit 70, and overlaps the first floor cross unit 122 and the second floor cross unit 124 when viewed from the vehicle-height direction. The center of the seat 98 in the vehicle width direction is positioned on the center line CL. In addition, the seat 98 is supported from the vehicle lower side by the seat supporting unit 100.

The seat supporting unit 100 includes a pair of front side supporting units 166 and a pair of rear side supporting units 168. The front side supporting unit 166 is made of channel steel and extends from the third cross member 112 to the vehicle upper side.

An end part on the vehicle lower side of the front side supporting unit 166 is fixed to an upper wall 112B of the third cross member 112 by a fixing member (not shown), and an end part on the vehicle upper side of the front side supporting unit 166 is fixed to an end part on the vehicle front side of each seat rail 164 by a fixing member (not shown). In other words, the seat 98 is connected to the first floor cross unit 122 via the front side supporting unit 166 and the third cross member 112.

The rear side supporting unit 168 includes an upper wall 168A having the plate thickness direction set as the vehicle-height direction, a pair of lateral walls 168B having the plate thickness direction set as the vehicle width direction, and a rear wall 168C having the plate thickness direction set as the vehicle front-rear direction. The rear side supporting unit 168 is in the shape of a box open to the vehicle front side and the vehicle lower side.

The rear wall 168C is attached to the partition unit 94 by a weld nut 170 provided on a surface on the vehicle rear side of the partition panel 142 on the vehicle front side and a bolt 172 fastened to the weld nut 170 from the vehicle front side thereof. Further, an end part on the vehicle rear side of the seat rail 164 is fixed to the upper wall 168A by a fixing member (not shown).

The constraint device 102 is a so-called three-point seat belt device, and includes a webbing 174, a retractor 176, a tongue plate 178, a buckle 180, a lower anchor 182, and a shoulder anchor 184.

The webbing 174 is wound around the retractor 176 when not in use, and is pulled out from the retractor 176 so as to constrain the driver 96 when in use.

The retractor 176 is arranged on the left side of the seat 98 in the vehicle width direction, and is fixed to the partition unit 94 by a fixing member (not shown). As described above, the retractor 176 stores the webbing 174 by winding it so as to pull it out. In addition, the retractor 176 restricts the pulling-out of the webbing 174 when a collision load is applied to the vehicle 10.

The tongue plate 178 is attached to the webbing 174 as the webbing 174 is inserted and can be engaged with the buckle 180.

The buckle 180 is provided at the lateral wall 168B on the right side in the vehicle width direction in the rear side supporting unit 168 on the right side in the vehicle width direction. The tongue plate 178 is detachable.

The lower anchor 182 is provided at an end part of the webbing 174 and is attached to the lateral wall 168B on the left side in the vehicle width direction in the rear side supporting unit 168 on the left side in the vehicle width direction.

The shoulder anchor 184 is arranged on the vehicle upper side of the retractor 176 and on the left side of the headrest 162 in the vehicle width direction, and is fixed to the partition unit 94 by a fixing member (not shown). The webbing 174 pulled out from the retractor 176 is inserted into the shoulder anchor 184. In the constraint device 102 configured as described above, when a collision load is applied to the vehicle 10, a load acting on the webbing 174 from the driver 96 is supported by the partition unit 94.

Meanwhile, the equipment unit 104 includes an equipment case 186 forming an outer shell thereof and "electronic equipment 188" accommodated in the equipment case 186. The equipment case 186 has an outer shape which is a rectangular parallelepiped, and is in the shape of a box open in the vehicle front side and the vehicle lower side, and is made of a metal, such as an aluminum alloy, suitable for blocking electromagnetic waves.

The equipment case 186 is fixed to the vehicle body 12 by a metal fixing member (not shown) while being supported by the main wall 118A of the center panel 118 of the vehicle body 12 from the vehicle lower side. In other words, the equipment case 186 is electrically connected to the vehicle body 12, that is, the equipment case 186 is body-grounded.

The electronic equipment 188 is attached to the main wall 118A or the equipment case 186 directly or via a member, such as a base member. Various pieces of equipment may be used as the electronic equipment 188, and high-voltage equipment of which a rated voltage is set to be 60 [V] or higher may be used. Examples of the high-voltage equipment may include electronic equipment, such as a junction box, an air conditioner compressor, and an inverter. The number of pieces of electronic equipment 188 stored in the equipment case 186 may be one or more.

The equipment unit 104 is arranged on the vehicle upper side of the main wall 118A of the center panel 118, and on the vehicle rear side of the extending wall 116B of the front panel 116 and the extending wall 118B of the center panel 118.

More specifically, the equipment unit 104 is arranged on the vehicle lower side of the seat 98 while a position of an upper surface of the equipment case 186 in the vehicle-height direction is approximately the same as that of an upper surface of the main wall 116A of the front panel 116 in the vehicle-height direction.

Further, as illustrated in FIG. 7, the entire equipment unit 104 is arranged to overlap the main wall 118A at the center of the main wall 118A in the vehicle width direction when viewed from the vehicle-height direction. Moreover, the entire equipment unit 104 is arranged to overlap the extending walls 116B, 118B when viewed from the vehicle front-rear direction.

Action and Advantageous Effect of Present Embodiment

Next, action and an advantageous effect of the present embodiment will be described.

In the present embodiment, as illustrated in FIG. 1, the seat 98 is arranged inside the vehicle cabin 40 and on the vehicle upper side of the electronic equipment 188. Therefore, a boarding space of the driver 96 inside the vehicle cabin 40 is secured on the vehicle upper side of the electronic equipment 188.

However, when the electronic equipment 188 is arranged outside the vehicle cabin 40, it is considered that a collision load applied to the vehicle 10 is likely to be applied to the electronic equipment 188.

Here, in the present embodiment, the inside of the vehicle cabin 40 is separated from the outside thereof by the front floor panel 106 composing the lower part of the vehicle cabin 40 in the vehicle-height direction. The electronic equipment 188 is supported by the main wall 118A of the center panel 118 composing a part of the front floor panel 106 from the vehicle lower side directly or via a member.

Moreover, in the front floor panel 106, the front panel 116 includes the extending wall 116B, and the center panel 118 includes the extending wall 118B, respectively, and the extending walls 116B, 118B are positioned on the vehicle front side of the electronic equipment 188. The main wall 118A is arranged to overlap the electronic equipment 188 when viewed from the vehicle-height direction, and the extending walls 116B, 118B are arranged to overlap the electronic equipment 188 when viewed from the vehicle front-rear direction.

Accordingly, in the present embodiment, a collision load applied to the vehicle 10 is applied to the main wall 118A or the extending walls 116B, 118B before being applied to the electronic equipment 188. Therefore, in the present embodiment, it is possible to prevent the electronic equipment 188 from being affected by a collision load applied to the vehicle 10 while preventing the electronic equipment 188 from restricting the boarding space of the driver 96 inside the vehicle cabin 40.

In addition, in the present embodiment, the first floor cross unit 122 is provided to project from the extending walls 116B, 118B side of the front floor panel 106 to the outer side of the vehicle cabin 40 when viewed from the vehicle width direction. Further, the second floor cross unit 124 is provided to project from the main wall 118A side of the front floor panel 106 to the outer side of the vehicle cabin 40 when viewed from the vehicle width direction. Therefore, it is possible to prevent the boarding space of the driver 96 inside the vehicle cabin 40 from being reduced by the first floor cross unit 122 and the second floor cross unit 124.

Moreover, the first floor cross unit 122 and the second floor cross unit 124 extend in the vehicle width direction, and have closed cross-sections when viewed from the vehicle width direction, respectively. Therefore, it is possible to increase a cross-sectional secondary moment of a cross-section of a part of the front floor panel 106 where the first floor cross unit 122 or the second floor cross unit 124 is provided when viewed from the vehicle width direction, as compared with a cross-sectional secondary moment of a cross-section of a part of the front floor panel 106 where the first floor cross unit 122 and the second floor cross unit 124 are not provided when viewed from the vehicle width direction. Therefore, in the present embodiment, it is possible to make the front floor panel 106 less likely to be deformed by a load in the vehicle width direction in a periphery of the electronic equipment 188 while securing the boarding space of the driver 96 inside the vehicle cabin 40.

In addition, in the present embodiment, the first floor cross unit 122 is provided along the periphery on the vehicle upper side of the extending wall 116B. The seat 98 is connected to the first floor cross unit 122 via the front side supporting unit 166 and the third cross member 112, and a load applied from the seat 98 side can be supported by the first floor cross unit 122. Therefore, in the present embodiment, the seat 98 can be supported in a stable state with respect to the front floor panel 106.

Further, in the present embodiment, the vehicle cabin 40 is separated in the vehicle front-rear direction by the partition unit 94 arranged on the vehicle rear side of the seat 98.

However, in supporting the seat 98, a supporting member may be arranged on the main wall 118A of the center panel 118 and support the seat 98. However, with such a configuration, it is considered that a bending moment generated to the supporting member by a load applied from the seat 98 side increases, and thus supporting the seat 98 in a stable state becomes difficult.

Here, in the present embodiment, the seat 98 is connected to the partition unit 94 via the rear side supporting unit 168, and the partition unit 94 is stretched in the vehicle-height direction between the roof panel 54 composing an upper part of the vehicle cabin 40 and the center floor panel 74. Therefore, a load applied from the seat 98 side is delivered to the roof panel 54 and the center floor panel 74 via the partition unit 94, and dispersed. Therefore, in the present embodiment, it is possible to support the seat 98 in a stable state while securing space for accommodating the electronic equipment 188 between the seat 98 and the center floor panel 74.

Moreover, in the present embodiment, as illustrated in FIGS. 4 and 7, the first pillar unit 50 extending in the vehicle-height direction is arranged on one side of the partition unit 94 in the vehicle width direction, and the second pillar unit 52 extending in the vehicle-height direction is arranged on the other side of the partition unit 94 in the vehicle width direction.

In addition, the roof panel 54 is reinforced by the upper cross unit 58 extending in the vehicle width direction, and the upper cross unit 58 is connected to the first pillar unit 50 and the second pillar unit 52 directly or via a member. On the other hand, the center floor panel 74 is reinforced by the lower cross unit 78 extending in the vehicle width direction, and, as illustrated in FIG. 5, the lower cross unit 78 is directly connected to the first pillar unit 50 and the second pillar unit 52. As such, the annular structure unit 92 having an annular shape when viewed from the vehicle front-rear direction is formed inside the vehicle cabin 40.

Further, the constraint device 102 that can constrain the driver 96 sitting in the seat 98 is attached to the partition unit 94, such that an inertial force generated to the driver 96 when the vehicle 10 brakes or a collision load is applied to the vehicle 10 is delivered to the partition unit 94 via the constraint device 102.

Here, in the present embodiment, the partition unit 94 and the annular structure unit 92 are continuous, and thus an inertial force generated to the driver 96 is delivered to the annular structure unit 92 via the constraint device 102 and the partition unit 94, and supported. Therefore, in the present embodiment, the constraint device 102 can constrain the driver 96 sitting in the seat 98 in a stable state.

In addition, in the present embodiment, the electronic equipment 188 is arranged to overlap the main wall 118A at the center of the main wall 118A of the center panel 118 in the vehicle width direction when viewed from the vehicle-height direction. Accordingly, when a collision load in the vehicle width direction is applied to the vehicle 10, it is possible to secure a distance between a point to which the collision load is applied and the electronic equipment 188. Therefore, in the present embodiment, it is possible to prevent a collision load applied to the vehicle 10 in the vehicle width direction from being applied to the electronic equipment 188.

Supplementary Description of Embodiments (1) In the above-described embodiment, the second floor cross unit 124 is provided on the front floor unit 70 of the vehicle body 12, but the configuration of the vehicle body 12 is not limited thereto. In other words, depending on specifications of the vehicle 10 and the like, the configuration of the vehicle body 12 may be simplified by constituting the vehicle body 12 without the second floor cross unit 124.

(2) In addition, in the above-described embodiment, the first floor cross unit 122 and the second floor cross unit 124 are composed of a plurality of members, but the configurations of the first floor cross unit 122 and the second floor cross unit 124 are not limited thereto. In other words, the members composing the vehicle body 12 may be simplified by constituting each of the first floor cross unit 122 and the second floor cross unit 124 with a single member in the shape of a rectangular tube extending in the vehicle width direction.

(3) Further, in the above-described embodiment, the front floor panel 106 is composed of a plurality of panel materials (plate materials), but the configuration of the front floor panel 106 is not limited thereto. In other words, depending on the specifications of the vehicle 10 and the like, the configuration of the vehicle body 12 may be simplified by constituting the front floor panel 106 with a single panel material. Moreover, depending on the specifications of the vehicle 10 and the like, the front floor panel 106 and the center floor panel 74 may be formed of a single panel material.

(4) Moreover, in the above-described embodiment, the seat 98 is connected to the partition unit 94 and the first floor cross unit 122 via members, but the configuration of the seat 98 is not limited thereto. In other words, depending on the specifications of the vehicle 10 and the like, the number of components may be reduced by directly connecting the seat 98 to the partition unit 94 and the first floor cross unit 122.

(5) In addition, in the above-described embodiment, the partition unit 94 is connected to the roof panel 54 via the upper cross unit 58, but the configuration of the partition unit 94 is not limited thereto. In other words, depending on the specifications of the vehicle 10 and the like, a load may be directly delivered between the partition unit 94 and the roof panel 54 by directly connecting the partition unit 94 to the roof panel 54.

(6) Further, in the above-described embodiment, the electronic equipment 188 is arranged at the center of the main wall 118A of the center panel 118 in the vehicle width direction, but the arrangement of the electronic equipment 188 is not limited thereto. In other words, depending on the specifications of the vehicle 10 and the like, the electronic equipment 188 may be arranged at, for example, an outer part of the main wall 118A in the vehicle width direction.

(7) In addition, in the above-described embodiment, it is also possible to arrange various pieces of equipment between the seat 98 and the equipment unit 104 so as to reduce a dead space inside the vehicle cabin 40. Moreover, instead of the seat supporting unit 100, the seat 98 may be supported by a base member which is in the shape of a box open to the vehicle lower side, and the base member may be supported by the first floor cross unit 122 and the partition unit 94. With such configurations, it is possible to protect various pieces of equipment with base members while arranging the various pieces of equipment inside the base members.

What is claimed is:

1. A structure of a vehicle cabin, the structure comprising:
   a vehicle seat arranged inside the vehicle cabin and above electronic equipment;
   a first panel unit composing a first part of a floor panel, arranged to overlap the electronic equipment when viewed from a vehicle-height direction, and supporting the electronic equipment from a vehicle lower side, the floor panel separating an inside of the vehicle cabin from an outside of the vehicle cabin and composing a lower part of the vehicle cabin;
   a second panel unit composing a second part of the floor panel and arranged in front of the electronic equipment in a vehicle front-rear direction to overlap the electronic equipment when viewed from the vehicle front-rear direction; and
   a third panel unit composing a third part of the floor panel and extending from a portion on a vehicle rear side of the first panel unit to the vehicle lower side.

2. The structure according to claim 1, further comprising a floor cross unit provided to project from at least one side of the first panel unit and the second panel unit to an outer side of the vehicle cabin when viewed from a vehicle width direction, extending in the vehicle width direction, and having a closed cross-section when viewed from the vehicle width direction.

3. The structure according to claim 2, wherein:
   the floor cross unit includes a first floor cross provided along a periphery on an upper side of the second panel unit; and
   the vehicle seat is connected to the first floor cross.

4. The structure according to claim 1, wherein:
   a separation unit that separates the vehicle cabin in the vehicle front-rear direction is arranged behind the vehicle seat in the vehicle front-rear direction;
   the separation unit extends in the vehicle-height direction between a roof panel composing an upper part of the vehicle cabin and the floor panel; and
   the vehicle seat is connected to the separation unit.

5. The structure according to claim 4, further comprising:
   a first pillar unit arranged on one side of the separation unit in a vehicle width direction and extending in the vehicle-height direction;

a second pillar unit arranged on the other side of the separation unit in the vehicle width direction and extending in the vehicle-height direction;

an upper cross unit configured to reinforce the roof panel which is connected to the first pillar unit and the second pillar unit and extends in the vehicle width direction; and a lower cross unit configured to reinforce the floor panel which is connected to the first pillar unit and the second pillar unit and extends in the vehicle width direction, wherein a constraint device that is configured to constrain an occupant sitting in the vehicle seat is attached to the separation unit.

6. The structure according to claim 1, wherein the electronic equipment is arranged to overlap the first panel unit at a center of the first panel unit in a vehicle width direction when viewed from the vehicle-height direction.

7. The structure according to claim 2, wherein the floor cross unit includes a second floor cross provided at a position which is a boundary between the first panel unit and the third panel unit.

8. The structure according to claim 1, wherein
the floor panel includes
a front panel extending from a portion on a vehicle upper side of the second panel unit to a vehicle front side, and
a center floor panel extending from a portion on the vehicle lower side of the third panel unit to the vehicle rear side, and
the floor panel is supported by a frame from the vehicle lower side, the frame including a pair of side frames that are spaced apart from each other in a vehicle width direction and extending in the vehicle front-rear direction.

9. The structure according to claim 2, wherein
the floor panel includes
a front panel extending from a portion on a vehicle upper side of the second panel unit to a vehicle front side, and
a center floor panel extending from a portion on the vehicle lower side of the third panel unit to the vehicle rear side,
the floor panel is supported by a frame from the vehicle lower side, the frame including a pair of side frames that are spaced from each other in the vehicle width direction and extending in the vehicle front-rear direction, and
the floor cross unit includes
a first floor cross provided at a position which is a boundary between the second panel unit and the front panel, and
a second floor cross provided at a position which is a boundary between the first panel unit and the third panel unit.

10. A structure of a vehicle cabin, the structure comprising:

a vehicle seat arranged inside the vehicle cabin and above electronic equipment;

a first panel unit composing a part of a floor panel, arranged to overlap the electronic equipment when viewed from a vehicle-height direction, and supporting the electronic equipment from a vehicle lower side, the floor panel separating an inside of the vehicle cabin from an outside of the vehicle cabin and composing a lower part of the vehicle cabin;

a second panel unit composing a part of the floor panel and arranged in front of the electronic equipment in a vehicle front-rear direction to overlap the electronic equipment when viewed from the vehicle front-rear direction; and a floor cross unit provided to project from at least one side of the first panel unit and the second panel unit to an outer side of the vehicle cabin when viewed from a vehicle width direction, extending in the vehicle width direction, and having a closed cross-section when viewed from the vehicle width direction,
wherein
the floor cross unit includes a first floor cross provided along a periphery on an upper side of the second panel unit; and
the vehicle seat is connected to the first floor cross.

11. The structure according to claim 10, wherein:
a separation unit that separates the vehicle cabin in the vehicle front-rear direction is arranged behind the vehicle seat in the vehicle front-rear direction;
the separation unit extends in the vehicle-height direction between a roof panel composing an upper part of the vehicle cabin and the floor panel; and
the vehicle seat is connected to the separation unit.

12. The structure according to claim 11, further comprising:
a first pillar unit arranged on one side of the separation unit in a vehicle width direction and extending in the vehicle-height direction;
a second pillar unit arranged on the other side of the separation unit in the vehicle width direction and extending in the vehicle-height direction;
an upper cross unit configured to reinforce the roof panel which is connected to the first pillar unit and the second pillar unit and extends in the vehicle width direction; and
a lower cross unit configured to reinforce the floor panel which is connected to the first pillar unit and the second pillar unit and extends in the vehicle width direction, wherein
a constraint device that is configured to constrain an occupant sitting in the vehicle seat is attached to the separation unit.

13. The structure according to claim 10, wherein the electronic equipment is arranged to overlap the first panel unit at a center of the first panel unit in a vehicle width direction when viewed from the vehicle-height direction.

* * * * *